(12) United States Patent
Yi et al.

(10) Patent No.: US 8,037,682 B2
(45) Date of Patent: Oct. 18, 2011

(54) METHOD AND DEVICE FOR SUPPRESSING VIBRATION OF BOOM OF CONCRETE PUMP TRUCK

(75) Inventors: Xiaogang Yi, Changsha (CN);
Yonghong Liu, Changsha (CN);
Guocheng Peng, Changsha (CN);
Chengzhi Guo, Changsha (CN);
Xionghui Miao, Changsha (CN)

(73) Assignee: Sany Heavy Industry Co., Ltd., Changsha, Hunan Province (CN)

( * ) Notice: Subject to any disclaimer, the term of this patent is extended or adjusted under 35 U.S.C. 154(b) by 271 days.

(21) Appl. No.: 11/993,599

(22) PCT Filed: Feb. 14, 2007

(86) PCT No.: PCT/CN2007/000530
§ 371 (c)(1),
(2), (4) Date: Jul. 15, 2008

(87) PCT Pub. No.: WO2008/043218
PCT Pub. Date: Apr. 17, 2008

(65) Prior Publication Data
US 2009/0211435 A1    Aug. 27, 2009

(30) Foreign Application Priority Data
Sep. 30, 2006    (CN) .......................... 2006 1 0032361

(51) Int. Cl.
*F04B 15/02*    (2006.01)
*E04G 21/04*    (2006.01)
(52) U.S. Cl. .......................... 60/469; 91/361
(58) Field of Classification Search .................... 60/469; 91/361
See application file for complete search history.

(56) References Cited

FOREIGN PATENT DOCUMENTS

| | | | |
|---|---|---|---|
| CN | 1486384 A | | 3/2004 |
| JP | 05141086 A | * | 6/1993 |
| JP | 05230999 A | * | 9/1993 |
| JP | 5-311879 | | 11/1993 |
| JP | 7-133094 | | 5/1995 |
| JP | 9-287290 | | 11/1997 |
| JP | 304059 B2 | | 3/2000 |
| JP | 2000-192660 | | 7/2000 |
| JP | 2000192660 A | * | 7/2000 |
| JP | 2005248627 A | * | 9/2005 |

* cited by examiner

*Primary Examiner* — Thomas E Lazo
(74) *Attorney, Agent, or Firm* — Frommer Lawrence & Haug LLP; Ronald R. Santucci

(57) ABSTRACT

The present invention discloses a method and device for suppressing vibration of boom of concrete pump truck, in which the boom cylinder is connected with the vibration suppression cylinder; the information about hydraulic pressure in the boom cylinder and/or about changing of concrete pumping direction is monitored by a pressure sensing unit in real time; the monitored information about hydraulic pressure and/or about changing of concrete pumping direction is transmitted to the control unit for vibration suppression cylinder; the control unit for vibration suppression cylinder analyzes and processes the monitored information and adjusts the volumes of the rod side chamber and the non-rod side chamber in the vibration suppression cylinder such that the vibration suppression cylinder may generate a pulsed vibration and the pulsed vibration at the end of the boom is less than or equal to the vibration amplitude caused by the intermittent concrete supply at the end of the boom in amplitude, with a phase difference of 180° between the two vibrations. The vibration suppression method and device for boom of concrete pump truck according to the present invention may be simply configured, easily implemented and operated to effectively suppress the boom vibration.

15 Claims, 11 Drawing Sheets

US 8,037,682 B2

METHOD AND DEVICE FOR SUPPRESSING VIBRATION OF BOOM OF CONCRETE PUMP TRUCK

This application is a 371 of PCT/CN2007/000530 filed on Feb. 14, 2007 which claims priority benefits from Chinese Patent Application No. 200610032361.X filed Sep. 30, 2006, the disclosure of which is hereby incorporated by reference.

FIELD OF THE INVENTION

The present invention generally relates to construction machinery, particularly to a method and device for suppressing vibration of boom of concrete pump truck.

BACKGROUND OF THE INVENTION

Presently, a large apparatus provided with a multi-segments rotary boom, such as a concrete pump arranged on a truck chassis or a concrete distributing boom arranged on a mobile lifting platform, is widely used in construction sites for distributing concrete from the pump truck to desired job sites. The apparatus generally comprises a pump truck chassis, a concrete pump, a pipe and a boom which is also referred to as a "distributing boom". Concrete is alternatively fed into the transporting pipe by means of a connecting mechanism by a double feeding cylinder mounted on the truck chassis. The pipe follows the movement of the multi-segments rotary boom in a certain and constant way such that concrete may be transported to a desired job site. The boom usually comprises 2-5 segments. Referring to FIG. 1, which shows a side view of a boom of a concrete pump truck when the truck is running or the boom is in its retracted position, a first boom segment 3, a second boom segment 4, a third boom segment 5, a fourth boom segment 6 and a fifth boom segment 7 are folded together through retraction movement of the pistons of boom cylinders 2. Each segment of the boom rotates with respect to one another about pivots 9 so as to be folded and unfolded. Due to the restriction of the available space and the configuration, the rotation of these boom segments about the pivots 9 is limited within a certain range. A driving means, i.e. a boom cylinder 2, is required to drive each segment of the boom to rotate. With a movement of the piston in the boom cylinder 2, the next neighborhood segment of the boom is driven to rotate by a linkage 8. A rotating platform 1 is mounted on the truck chassis or the mobile lifting platform. When operated, the rotating platform 1 and components thereon may rotate about a vertical axis, and concrete is transported to a hose 10 located at the end of the boom through a pipe attached to the boom and then discharged from the outlet of the hose 10 to prescribed sites. Since the segments of the boom may rotate with respect to one another, the concrete transporting pipe attached thereon is also capable of rotating about pivots 9. Considerable resonance may be developed at the hose 10 attached to the end of the boom if concrete is intermittently supplied. Since such apparatus usually employs a double-piston feeding cylinder to supply concrete circularly, a pulsed impulsion is easily induced during supplying concrete such that the boom may vibrate. Such a vibration is especially disadvantageous in that it may cause a misalignment of the end of the boom as well as a cracking of the boom. If a supply frequency of the double-pistons feeding cylinder for supplying concrete is close to one half of the current natural frequency of the boom or approximate to the current natural frequency of the boom, considerable resonance, which will have an amplitude above 1000 mm under certain circumstance, may be developed in the boom. Therefore, to reduce damages and dangers caused by the resonance to the boom and the operator, the supply frequency of the pump has to be reduced such that the vibration of the end of the boom is limited within a certain range.

SUMMARY OF THE INVENTION

The technical problem to be solved by the present invention is to, in respect to the technical problem in the prior art, provide a method and device for suppressing vibration of boom of concrete pump truck, which may be simply constructed, easily manipulated, and may effectively suppress vibration of the boom.

To solve the above technical problem, one aspect of the present invention provides a method for suppressing vibration of boom of concrete pump truck, comprising the steps of: coupling a boom cylinder with a vibration suppression cylinder; monitoring information about hydraulic pressure in the boom cylinder and/or information about changing of concrete pumping direction by a pressure sensing unit in real time; transmitting the monitored information about hydraulic pressure and/or the information about changing of concrete pumping direction to a control unit for vibration suppression cylinder; the control unit for vibration suppression cylinder analyzing and processing the monitored information and then adjusting volumes of a rod side chamber and a non-rod side chamber in the vibration suppression cylinder, such that the vibration suppression cylinder generates a pulsed vibration; wherein the pulsed vibration from the vibration suppression cylinder causes a pulsed vibration at the end of the boom, and the pulsed vibration at the end of the boom is less than or equal to a vibration caused by an intermittent concrete supply at the end of the boom in amplitude and the pulsed vibration at the end of the boom is reversed with respect to the vibration caused by an intermittent concrete supply at the end of the boom in phase.

The boom cylinder is connected with the vibration suppression cylinder via piping lines, the rod side chamber as well as the non-rod side chamber in the boom cylinder are communicated with the rod side chamber as well as the non-rod side chamber in the vibration suppression cylinder, respectively, and the volumes of the rod side chamber and the non-rod side chamber in the vibration suppression cylinder are repeatedly adjusted by the control unit for vibration suppression cylinder to correspondingly change volumes of a rod side chamber and a non-rod side chamber in the boom cylinder such that the boom cylinder generates a pulsed vibration.

The boom cylinder is rigidly connected with the vibration suppression cylinder, and the volumes of the rod side chamber and the non-rod side chamber in the vibration suppression cylinder are repeatedly adjusted by the control unit for vibration suppression cylinder such that the Vibration suppression cylinder generates the pulsed vibration to cause the pulsed vibration at end of the boom.

Information about displacement of a piston rod of the boom cylinder and/or displacement of a piston rod of the vibration suppression cylinder is monitored in real time, the monitored displacement information is transmitted to the control unit for vibration suppression cylinder, and the control unit for vibration suppression cylinder analyzes and processes the monitored information and then, taking into account the information about hydraulic pressure in the boom cylinder and/or information about hydraulic pressure in the vibration suppression cylinder, repeatedly adjusts the volumes of the rod side chamber and the non-rod side chamber in the vibration suppression cylinder.

A device for suppressing vibration of boom of concrete pump truck comprises: a boom cylinder, a control unit for boom cylinder, a vibration suppression cylinder, a control unit for vibration suppression cylinder and a monitoring unit, the boom cylinder is connected with the vibration suppression cylinder, the control unit for boom cylinder is connected with the boom cylinder, the control unit for vibration suppression cylinder is connected with the vibration suppression cylinder, and the monitoring unit for monitoring information about hydraulic pressure in the boom cylinder and/or for monitoring information about changing of concrete pumping direction is connected with the control unit for vibration suppression cylinder.

The hydraulic cylinder is rigidly connected with the vibration suppression cylinder.

A non-rod side chamber in the boom cylinder is fixedly connected with a non-rod side chamber in the vibration suppression cylinder, with a partition plate provided between the non-rod side chamber in the boom cylinder and the non-rod side chamber in the vibration suppression cylinder.

A piston rod of the vibration suppression cylinder is fixedly connected with the boom cylinder.

A piston rod of the boom cylinder is fixedly connected with the vibration suppression cylinder.

A piston rod of the vibration suppression cylinder is fixedly connected with a piston rod of the boom cylinder.

The control unit for vibration suppression cylinder comprises a vibration suppression electromagnetic valve and a vibration suppression controller connected with the vibration suppression cylinder via the vibration suppression electromagnetic valve and the vibration suppression controller is coupled with the monitoring unit.

A rod side chamber and a non-rod side chamber in the boom cylinder are communicated with a rod side chamber and a non-rod side chamber in the vibration suppression cylinder via piping lines, respectively.

The control unit for vibration suppression cylinder comprises a vibration suppression controller, a vibration suppression electromagnetic valve and a control cylinder, the vibration suppression controller is connected with the control cylinder via the vibration suppression electromagnetic valve and coupled with the monitoring unit, and a piston rod of the control cylinder is connected with a piston rod of the vibration suppression cylinder.

The control unit for vibration suppression cylinder comprises a vibration suppression controller, a vibration suppression electromagnetic valve, a hydraulic motor and a torque converting mechanism, the vibration suppression controller is connected with the hydraulic motor via the vibration suppression electromagnetic valve and coupled with the monitoring unit, and the hydraulic motor is connected with a piston rod of the vibration suppression cylinder via the torque converting mechanism.

The control unit for vibration suppression cylinder comprises a spring damping device, a spring damping controller and a vibration suppression controller coupled with the monitoring unit, and the vibration suppression controller is connected with the spring damping device via the spring damping controller.

The boom cylinder is provided between every two neighboring segments of the boom, and the vibration suppression cylinders is fitted on the boom or the truck body and connected with the boom cylinder via piping lines.

The present invention is superior to prior art in that:

1. The solution according to the present invention may effectively suppress vibration of the boom, and may be especially advantageous to an accurate positioning of the hose at the end of the boom. The amplitude of the vibration at the end of the boom may reduce by 80% in a favorable operating condition. Therefore, the solution of the present invention is especially economically beneficial in that the fatigue resistance and the life of the boom is greatly improved, while the maintenance cost is considerably reduced. Meanwhile, the present invention may be applied to different booms, or a device according to the present invention may be conveniently added to a sold pump truck, with little modification, such that the truck may be provided with a vibration suppression function.

2. According to the present invention, the vibration suppression cylinder is connected with the boom cylinder via hydraulic circuits, and an additional vibration suppression cylinder and the control unit thereof may be conveniently added to the pump truck without modifying the original configuration and control system of the pump truck. Therefore, the solution according the present invention has a simplified structure and can be easily implemented. Controls of vibration suppression and amplitude variation may be carried out separately, and then combined together by hydraulic circuits and carried out by the boom cylinder.

3. According to an embodiment of the present invention, the vibration suppression cylinder and the boom cylinder are rigidly connected with each other. The only modification required is to replace a conventional boom cylinder with the inventive combined formation of a vibration suppression cylinder and a boom cylinder. Controls of vibration suppression and amplitude variation are carried out separately rather than combined together, i.e., the vibration suppression cylinder carries out the function of the vibration suppression, and the boom cylinder carries out the function of the amplitude variation. Even if malfunctions occur in the vibration suppression cylinder or the vibration suppression control system, the amplitude vibration of the boom may be carried out without causing a shut-down of the whole system. Therefore, the system according to the present invention is highly reliable.

Figure 1:
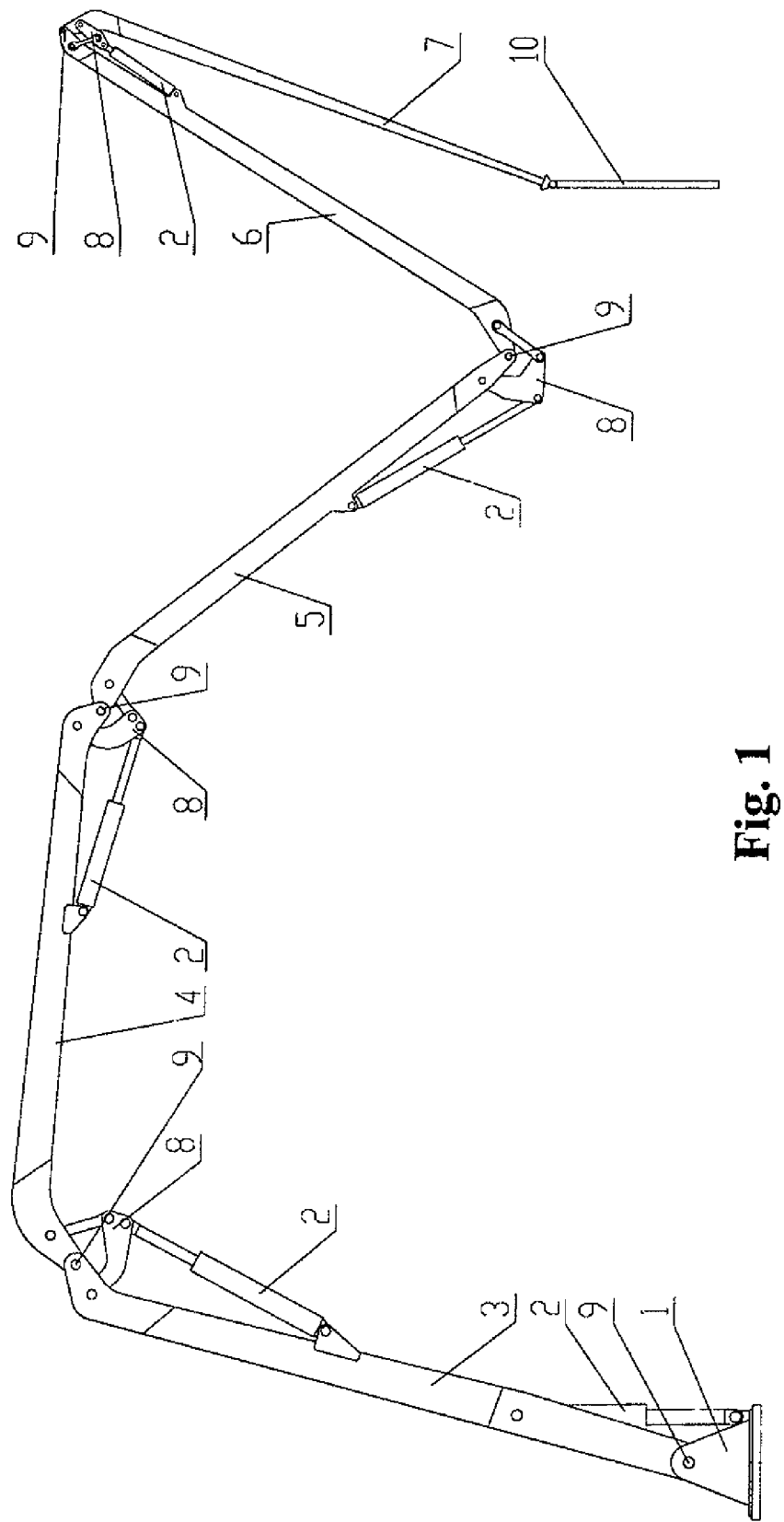
FIG. 1 shows a structural diagram of a boom of a concrete pump truck.

REFERENCE NUMERALS 1. rotating platform;
2. boom cylinder;
3. first boom segment;
4. second boom segment;
5. third boom segment;
6. fourth boom segment;
7. fifth boom segment;
8. linkage;
9. pivot;
10. hose;
11. hydraulic pressure sensing unit;
12. non-rod side chamber in the boom cylinder;
13. piston of the boom cylinder;
14. rod side chamber in the boom cylinder;
15. piston rod of the boom cylinder;
16. first displacement sensing unit;
18. first pressure sensing unit;
19. partition plate;
21. vibration suppression cylinder;
22. non-rod side chamber in the vibration suppression cylinder;
23. piston of the vibration suppression cylinder;
24. rod side chamber in the vibration suppression cylinder;
25. piston rod of the vibration suppression cylinder;
26. second displacement sensing unit;
28. second pressure sensing unit;
31. control cylinder;
32. non-rod side chamber in the control cylinder;
33. piston of the control cylinder;
34. piston rod of the control cylinder;
35. rod side chamber in the control cylinder;
38. third pressure sensing unit;
41. controller for amplitude variation;
42. electromagnetic valve for amplitude variation;
43. vibration suppression electromagnetic valve;
44. vibration suppression controller;
45. main hydraulic pump;
46. hydraulic reservoir;
50. torque converting mechanism;
51. hydraulic motor;
52. spring damping device;
53. spring damping controller;
61. switch pulse from the pumping cylinder of the pump truck;
62. switch pulse from the switch valve of the pump truck;
63. information about position and amplitude variation of boom;
64. safety monitoring system for monitoring vibration of boom;
71. control unit for boom cylinder;
72. control unit for vibration suppression cylinder.

DETAILED DESCRIPTION OF THE INVENTION

The present invention will be further explained in conjunction with accompanying figures and detailed embodiments.

Figure 2:
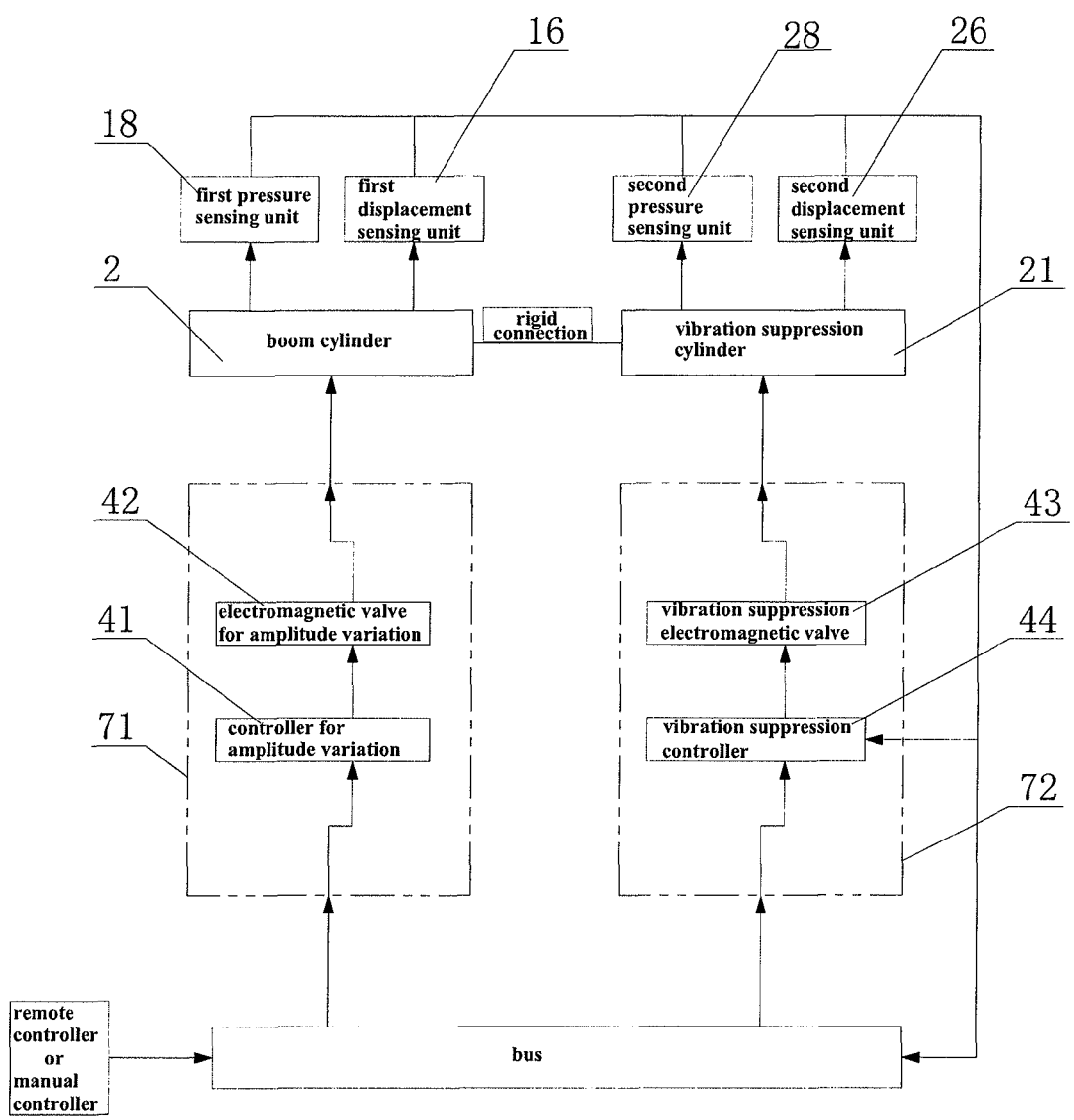
FIG. 2 illustrates a flow chart of a vibration suppression method according to a first embodiment of the present invention.
Figure 7:
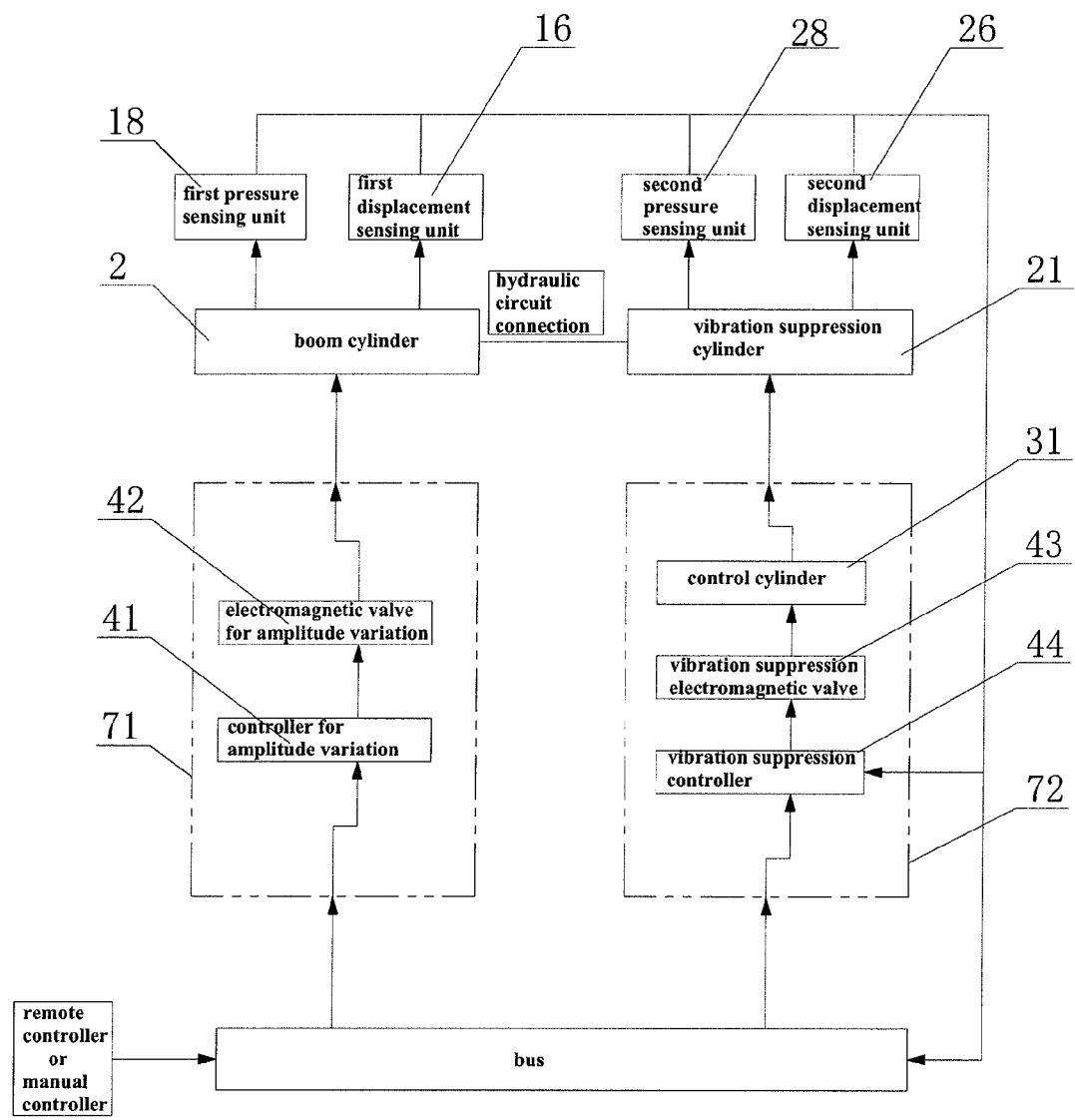
FIG. 7 illustrates a flow chart of a vibration suppression method according to a second embodiment of the present invention.

Based on the vibration formation and propagation theory, for one harmonic vibration, as long as the other vibration with same frequency and amplitude as well as a phase difference of 180°, i.e., a negative vibration, is superposed on the vibration, the overall vibration may be controlled in a desired level. According to this basic theory, starting from suppressing vibration at the end of the boom, the applicant made experimental and theoretical studies on the vibration phenomenon at the end of the boom, and found out that vibration at the end of the boom is a superposition of multiple waves similar to harmonic waves. An active vibration-suppression strategy is employed based on the above-mentioned vibration suppression method using a negative vibration. The phase of the active vibration is reversed to that of the boom vibration caused by the pulsed impulsion when concrete is not supplied continuously, while the amplitude and frequency of the active vibration is the same as those of the boom vibration caused by the pulsed impulsion. When the active vibration and the boom vibration caused by the pulsed impulsion having reversed phases and same frequencies are superposed from each other, the overall boom vibration, especially at the end thereof, may be controlled in the desired level. Based on this theory, referring to FIGS. 2 and 7, the method for suppressing vibration of boom of concrete pump truck according to the present invention comprises the following steps: coupling a boom cylinder 2 with a vibration suppression cylinder 21; monitoring information about hydraulic pressure in the boom cylinder 2 and/or about changing of concrete pumping direction by pressure sensing units in real time; transferring the monitored information about hydraulic pressure and/or changing of concrete pumping direction to a control unit 72 for vibration suppression cylinder; analyzing and processing the information, and then repeatedly adjusting volumes of a rod side chamber and a non-rod side chamber in the vibration suppression cylinder 21 by the control unit 72 for vibration suppression cylinder such that the vibration suppression cylinder 21 and the boom cylinder 2 generate a pulsed vibration, such that the vibration caused by the pulsed vibration at the end of the boom is smaller than or equals to the vibration caused by the pulsed impulsion of the intermittent transport of the concrete in the amplitude and is reversed in the phase. Among which, a feasible solution is to couple the boom cylinder 2 with the vibration suppression cylinder 21 via hydraulic pipes, and the control unit 72 for vibration suppression cylinder repeatedly adjusts volumes of the rod side chamber and the non-rod side chamber in the vibration suppression cylinder 21, and simultaneously changes volumes of a rod side chamber and a non-rod side chamber in the boom cylinder 2 such that the boom cylinder 2 generates a pulsed vibration. Another possible solution is to rigidly connect the boom cylinder 2 to the vibration suppression cylinder 21, and the control unit 72 for vibration suppression cylinder repeatedly adjusts volumes of the rod side chamber and the non-rod side chamber in the vibration suppression cylinder 21, such that the vibration cylinder 21 generates a pulsed vibration and at the same time drive the boom cylinder 2 to generate a pulsed vibration. In a preferred embodiment, displacement of piston rods in the boom cylinder 2 and/or vibration cylinder 21 is monitored in real time and the monitored information about the displacement is transferred to the control unit 72 for vibration suppression cylinder. The control unit 72 for vibration suppression cylinder analyzes and processes the information, then, taking into account the information about hydraulic pressure in the boom cylinder 2 and/or vibration suppression cylinder 21, repeatedly adjusts volumes of the rod side chamber and the non-rod side chamber in the vibration suppression cylinder 21. Meanwhile, it is possible to merely monitor one boom cylinder 2 or several boom cylinders 2 of the multi-segments boom, while the other boom cylinders 2 may be controlled via the vibration suppression cylinder 21, to generate the corresponding pulsed vibration.

A theoretical analysis is carried out hereinafter in conjunction with the vibration suppression method according to the present invention and the vibration suppression conception described above. Assuming the boom system is a flexible, multibody dynamic system. When subjected to cyclic impulsions, regardless of variations in waveforms of the impulsions, as long as the impulsions per se are cyclically repeated, the end of the boom will vibrate cyclically and this vibration wave is a superposition of several harmonic waves. The displacement at the end of the boom may be simply described as:

$$S = \sum_{i=1}^{n} A_i \sin(\omega_i t + \phi_i) \quad i = 1, 2, 3 \ldots, n \quad \text{(Equation 1)}$$

where S represents the total amplitude at the end of the boom, $A_i$ represents the amplitude of the $i^{th}$ order vibration mode of the cylinder, $\omega_i$ represents the frequency of the $i^{th}$ order vibration mode of the cylinder, t represents time, and $\phi_i$ represents the phase angle of the $i^{th}$ order vibration mode of the cylinder.

Since the vibration at the end of the boom is the superposition of cyclic harmonic waves, based on the above vibration suppressing idea, a conceivable solution is to make the boom cylinder 2 generate a pulsed vibration so as to cause the boom per se to vibrate in a reversed phase. Such a vibration caused by the pulsed vibration of the boom cylinder 2 is provided with the same frequency and amplitude as well as a reversed phase with respect to the vibration occurred at the end of the boom, such that the overall vibration of the boom may be controlled in a desired level. The displacement at the end of the boom caused by an active vibration of the boom cylinder 2 may be described as:

$$S' = \sum_{i=1}^{n} A_i \sin(\omega_i t + \phi_i + \pi) \quad i = 1, 2, 3 \ldots, n \quad \text{(Equation 2)}$$

where S' represents the total amplitude at the end of the boom caused by the vibration of the cylinder, $A_i$ represents the amplitude of the $i^{th}$ order vibration mode of the cylinder, $\omega_i$ represents the frequency of the $i^{th}$ order vibration mode of the cylinder, t represents time, $\phi_i$ represents the phase angle of the $i^{th}$ order vibration mode of the cylinder, and $\pi$ represents the phase difference of the vibration modes of the cylinder.

When the boom is vibrated, the boom cylinder 2 generates a controllable active vibration, such that the overall vibration of the boom will be a superposition of various vibrations, and thus the overall displacement at the end of the boom may be mathematically expressed as:

$$\begin{aligned} S_0 &= S + S' \\ &= \sum_{i=1}^{n} A_i \sin(\omega_i t + \phi_i) + \sum_{i=1}^{n} A_i \sin(\omega_i t + \phi_i + \pi) \\ &= 0 \end{aligned} \quad \text{(Equation 3)}$$

$$i = 1, 2, 3 \ldots, n$$

Although it is mathematically possible to completely suppress the vibration of the boom caused by the pulsed impulsion of the concrete, such a theoretical model is only an approximate hypothesis of the practical situation. Accordingly, the overall vibration amplitude at the end of the boom, during theoretical calculation, is controlled to be within 2 mm, rather than absolutely zero as in the mathematically model. It is neither necessary nor possible to completely eliminate the vibration of the boom caused by a superposition of semi-harmonic waves. It is only necessary to consider the lower order polynomials in Equation 3. Further experimental researches were carried out to demonstrate the reliability of the above theoretical model and calculation. The experimental results show that, for a certain concrete pump truck under a given circumstance, the vibration amplitude at the end of the boom may be controlled within 50 mm, which proves the effectiveness of the method described above.

In practical operations, although the vibration amplitude at the end of the boom may reach a high value such as more than 1000 mm, the reciprocating displacement of the piston of the boom cylinder 2 for suppressing the vibration is relatively small. The reason is in that the boom system is a complicated mechanism in which a tiny movement of the piston of the boom cylinder 2 is capable to cause a relatively large movement at the end of the boom, i.e. the movement of the piston of the boom cylinder 2 may be amplified to a certain extent. Meanwhile, different amplification factors are assigned to boom cylinders 2 arranged at different positions. Therefore, by optimally choosing positions of the boom cylinders 2, a desired vibration suppression effect can be achieved.

Embodiment 1

Figure 3:
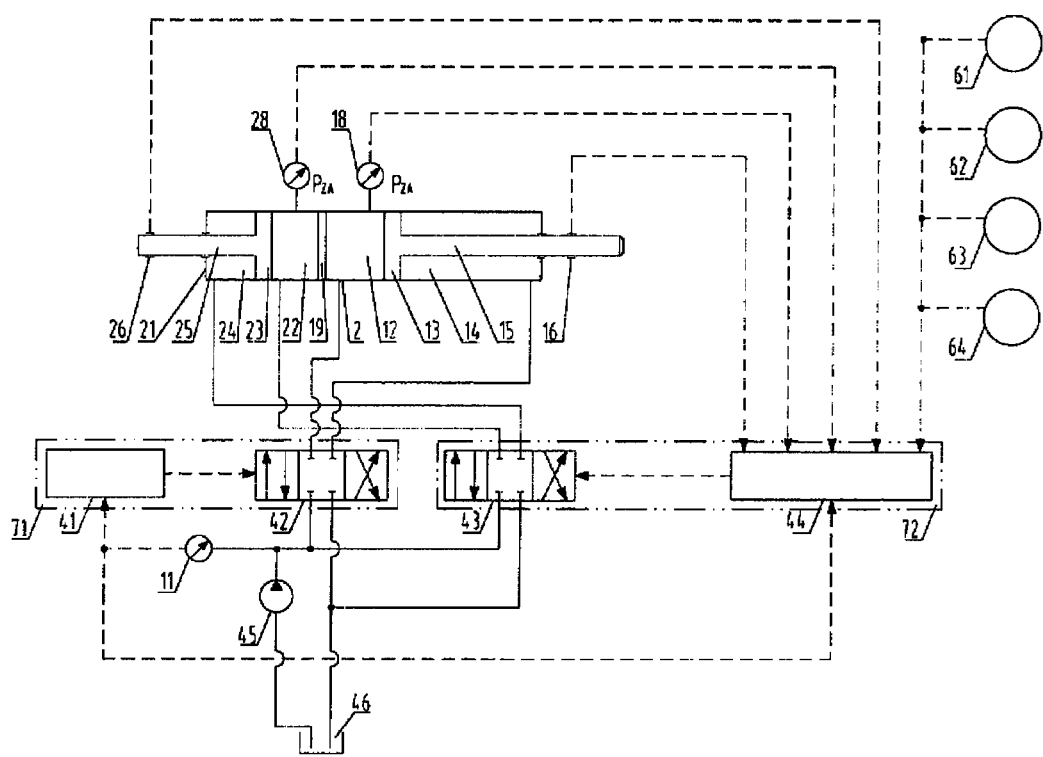
FIG. 3 illustrates a structural diagram of a first vibration suppression device applying the vibration suppression method according to the first embodiment of the present invention.
Figure 4:
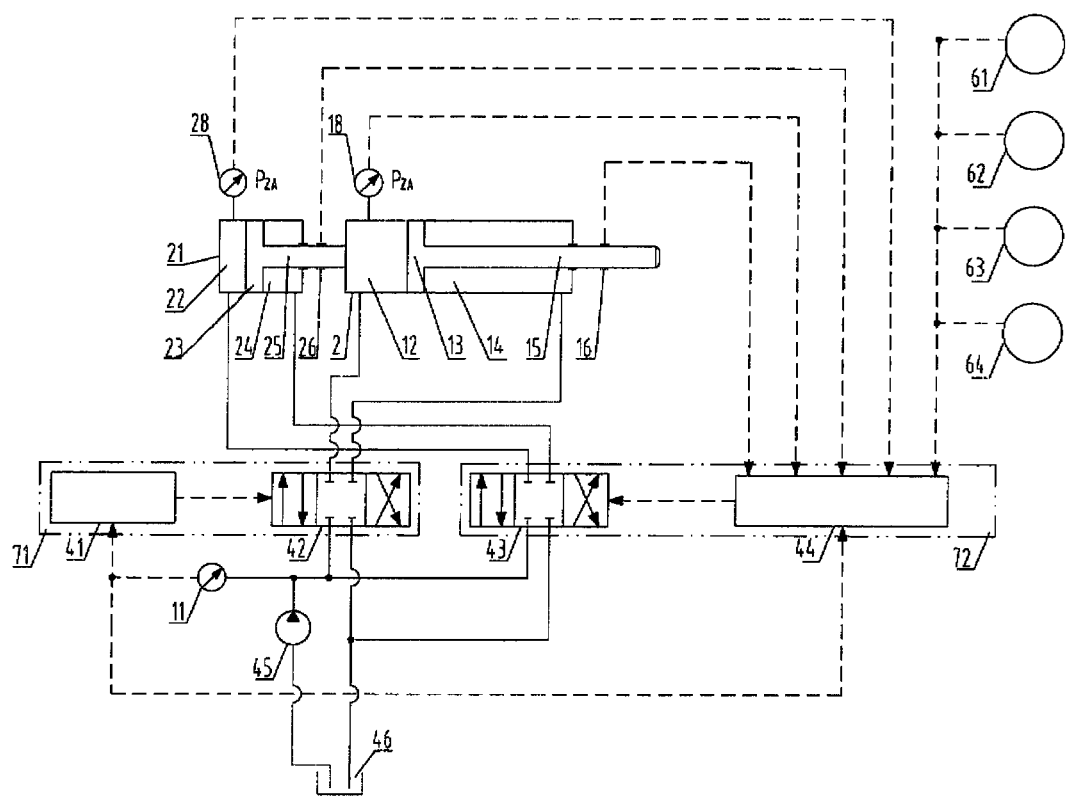
FIG. 4 illustrates a structural diagram of a second vibration suppression device applying the vibration suppression method according to the first embodiment of the present invention.
Figure 5:
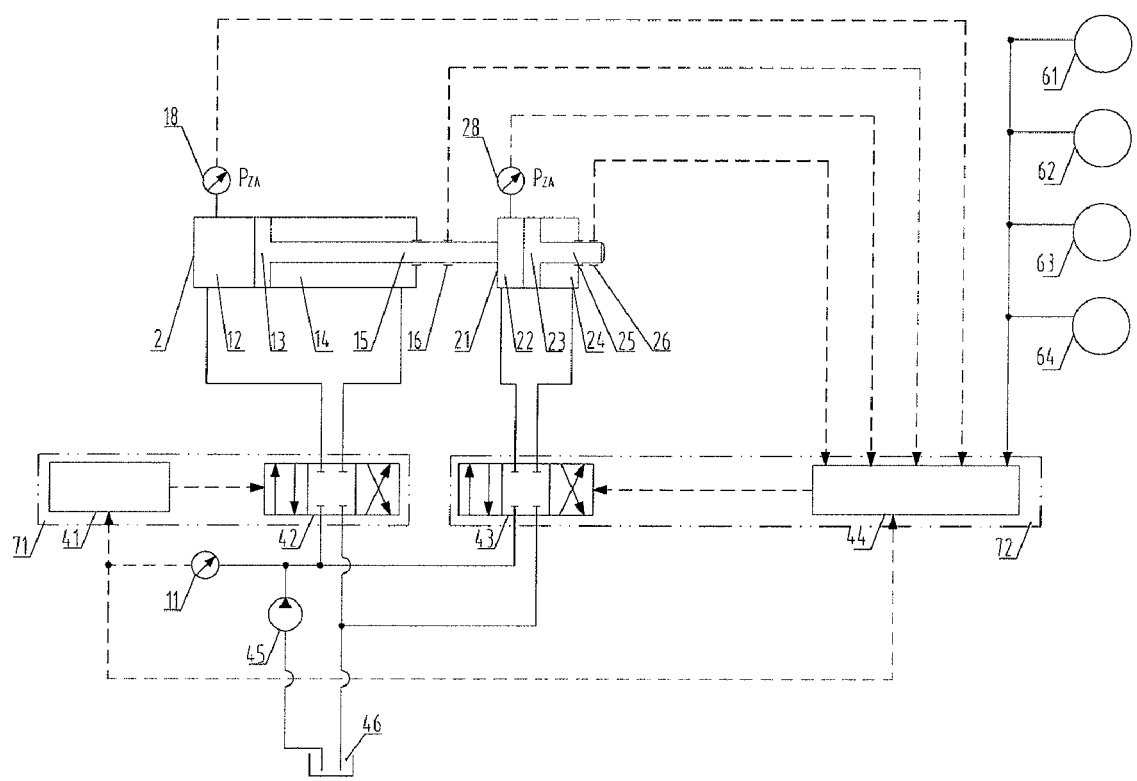
FIG. 5 illustrates a structural diagram of a third vibration suppression device applying the vibration suppression method according to the first embodiment of the present invention.
Figure 6:
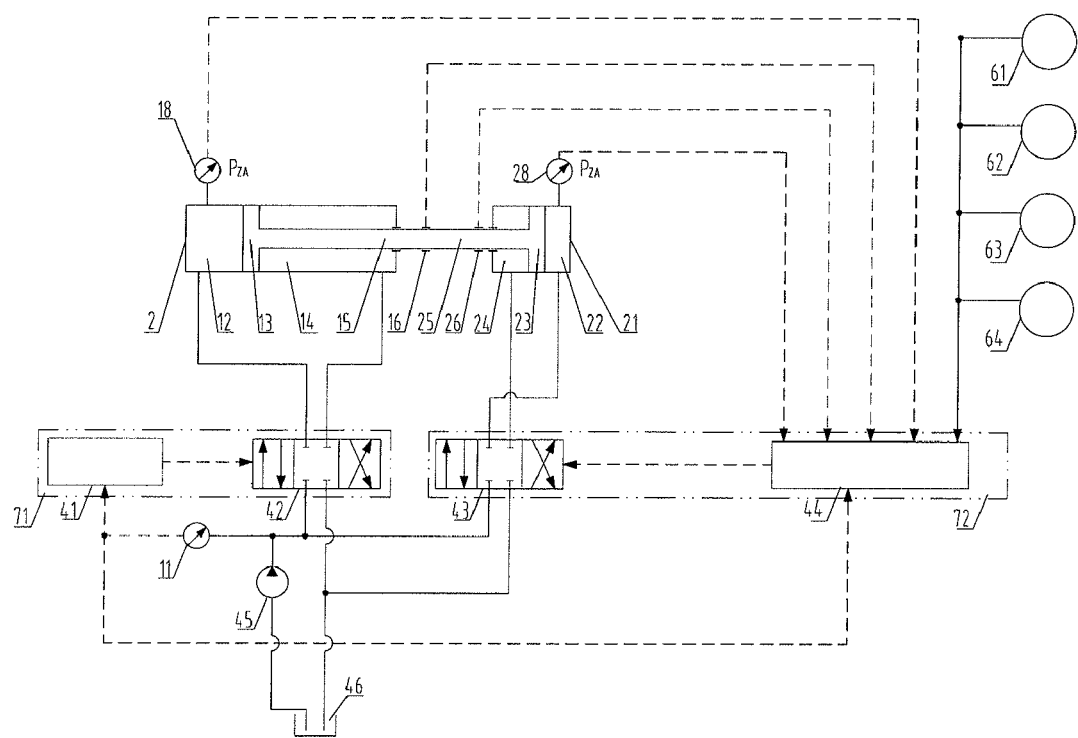
FIG. 6 illustrates a structural diagram of a fourth vibration suppression device applying the vibration suppression method according to the first embodiment of the present invention.

Based on the above vibration suppression method, the present invention provides a device for suppressing vibration of boom of concrete pump truck, comprising a boom cylinder 2, a control unit 71 for boom cylinder, a vibration suppression cylinder 21, a control unit 72 for vibration suppression cylinder and a monitoring unit, wherein the boom cylinder 2 is connected with the vibration suppression cylinder 21, the control unit 71 for boom cylinder is connected with the boom cylinder 2, the control unit 72 for vibration suppression cylinder is connected with the vibration suppression cylinder 21, and the monitoring unit for monitoring hydraulic pressure in the boom cylinder 2 and/or for monitoring changing of concrete pumping direction is connected with the control unit 72 for vibration suppression cylinder. The monitoring unit comprises a first pressure sensing unit 18 for monitoring the boom cylinder 2 and a second pressure sensing unit 28 for monitoring the vibration suppression cylinder 21. The boom cylinder 2 is divided into a non-rod side chamber 12 of the boom cylinder and a rod side chamber 14 of the boom cylinder by a piston 13 of the boom cylinder, and the vibration suppression cylinder 21 is divided into a non-rod side chamber 22 of the vibration suppression cylinder and a rod side chamber 24 of the vibration suppression cylinder by a piston 23 of the vibration suppression cylinder. Hydraulic oils for the control unit 72 for vibration suppression cylinder and the control unit 71 for boom cylinder are both supplied by a main hydraulic pump 45 and a hydraulic reservoir 26. Among which, the hydraulic cylinder 2 is rigidly connected with the vibration suppression cylinder 21. As shown in FIG. 3, the non-rod side chamber 12 of the boom cylinder 2 is fixed to the non-rod side chamber 22 of the vibration suppression cylinder 21, with a fixed partition plate 19 provided between the non-rod side chamber 12 of the boom cylinder and the non-rod side chamber 22 of the vibration suppression cylinder. The partition plate 19 allows the hydraulic oil of the non-rod side chambers 12 of the boom cylinder and hydraulic oil of the non-rod side chamber 22 of the vibration suppression cylinder to be separately controlled. Referring to FIG. 4, it is also possible to fixedly connect the piston rod 25 of the vibration suppression cylinder to the boom cylinder 2, or to fixedly connect the piston rod 15 of the boom cylinder to the vibration suppression cylinder 21 (as shown in FIG. 5), or to fixedly connect the piston rod 25 of the vibration suppression cylinder to the piston rod 15 of the boom cylinder (as shown in FIG. 6). With such a rigid connection, the vibration of the vibration suppression cylinder 21 may drive the boom cylinder 2 to vibrate synchronizedly. The control unit 72 for vibration suppression cylinder comprises a vibration suppression electromagnetic valve 43 and a vibration suppression controller 44 connected with the vibration suppression cylinder 21 via the vibration suppression electromagnetic valve 43. The vibration suppression controller 44 is coupled with the monitoring unit, which is used to monitor operating parameters in the boom cylinder 2 and/or the vibration suppression cylinder 21 in real time, i.e., to monitor pressures and/or position of respective pistons in real time. The monitoring unit further comprises a set of or several sets of displacement sensing units, which correspondingly comprise a first displacement sensing unit 16 for monitoring the boom cylinder 2 and a second displacement sensing unit 26 for monitoring the vibration suppression cylinder 21. The control unit 72 for vibration suppression cylinder is further capable to monitor a switch pulse 61 from pumping cylinder of pump truck, a switch pulse 62 from switch valve of pump truck, information 63 about position and amplitude variation of boom, information 64 about a safety monitoring system for monitoring vibration of boom, etc. Based on the monitored information, the vibration suppression controller 44 performs an analysis, controls actions of the vibration suppression electromagnetic valve 43 in accordance with a preferred algorithm, and drives the piston 23 of the vibration suppression cylinder to reciprocate in line with the preferred algorithm, such that the vibration suppression cylinder 21 may generate a pulsed vibration accordingly. Due to the rigid connection between the vibration suppression cylinder 21 and the boom cylinder 2, it is possible to further drive the boom cylinder 2 to generate a tiny pulsation. Such a pulsation acts on the boom and is further transmitted to the end of the boom. This pulsation is provided with a reverse phase as well as an identical frequency and a close amplitude with respect to the vibration caused by the pulsed impulsion of the intermittent concrete supply, such that the overall vibration of the boom may be suppressed in a desired level. Between every two neighboring boom segments, there is provided with one boom cylinder 2, and the vibration suppression cylinders 21 is fixed to the boom cylinder 2.

According to the present invention, the boom cylinder 2 is actively and directly driven, such that the boom is capable of vibrating with variable amplitudes by means of the boom cylinder 2 under the control of the control unit 71 for boom cylinder. A separate vibration suppression system is designed to suppress vibrations of the boom. However, as a matter of fact, when the control unit 71 for boom cylinder does not perform any operation, of the entire boom cylinder will be kept at rest and can not move. According to the present invention, the vibration suppression cylinder 21 is rigidly connected to the boom cylinder 2, and drives the piston 23 of the vibration suppression cylinder under the control of the vibration suppression controller 44 to perform a preferable reciprocating movement. Therefore, by controlling the reciprocating movement of the piston 23 of the vibration suppression cylinder, the piston rod 25 of the vibration suppression cylinder generates a pulsed vibration. Such a pulsed vibration is then transmitted to the boom cylinder 2, such that the piston thereof will perform a desired pulsed displacement, and the vibration amplitude at the end of the boom caused by the pulsed displacement is smaller than or equal to the vibration amplitude at the end of the boom caused by the pulsed impulsion of the intermittent concrete supply, with their vibration phase reversed. Accordingly, the overall vibration at the end of the boom may be suppressed in a desired level.

As a matter of fact, during operation, the pumping frequency of the pump truck will vary according to the relation between supply and demand. Therefore, the pulse frequency of the piston rod 25 of the vibration suppression cylinder is required to be able to automatically follow the actual variation of the operation frequency of the pump truck. Meanwhile, to reduce the vibration at the end of the boom, it is necessary for the vibration at the end of the boom caused by the displacement of the piston rod 25 of the vibration suppression cylinder to be reversed in the phrase with respect to the vibration caused by the intermittent concrete supply. To achieve this, a monitoring unit (at least one pressure sensor) has to be provided to monitor the variation curve of the hydraulic pressure in the non-rod side chamber 12 of the boom cylinder and the non-rod side chamber 22 of the vibration suppression cylinder. It has been proved experimentally that a certain correlation exists between this pressure variation and the intermittent concrete supply as well as the vibration at the end of the boom. Therefore, vibration characteristics at the end of the boom may be determined by the obtained the variation curve of the hydraulic pressure. The control unit 72 for vibration suppression cylinder receives the data of the variation curve and mainly studies the time at which the wave crests, wave troughs appear in the pressure curve and the frequency characteristics of the pressure curve, and obtains parameters which characterizes the vibration at the end of the boom, such as frequency or phases. After such an analysis, a certain parameter of the pressure curve is chosen to set a timing reference of the control unit 72 for vibration suppression cylinder. Based on the above result, after a time shifting (or a phase angle shifting derived from a mathematical manipulation) corresponding to a pumping period, the vibration suppression cylinder 21 is activated such that the piston rod 25 of the vibration suppression cylinder generates a reciprocating movement. Meanwhile, it is guaranteed that the vibration at the end of the boom caused by this movement is reversed in the phrase with respect to the vibration at the end of the boom caused by the concrete supply, such that the overall vibration at the end of the boom may be effectively reduced. After the above efforts, parameters such as phase angle and frequency used in driving the vibration suppression cylinder 21 are successfully obtained. However, the amplitude vibration at the end of the boom may vary according to different operating conditions or different postures, therefore, it is also necessary to control the stroke of the piston of the vibration suppression cylinder 21 such that the vibration at the end of the boom caused by the vibration suppression cylinder 21 is less than or equal to the vibration at the end of the boom caused by the intermittent concrete supply. Thus, it is necessary to use the monitoring unit to collect displacement information. In this situation, the monitoring unit comprises at least a displacement sensor or a speed sensor, preferably a displacement sensor, for monitoring displacements of the piston 13 of the boom cylinder and/or piston 23 of the vibration suppression cylinder. By controlling the displacement of the piston rod 25 of the vibration suppression cylinder, the vibration suppression effect at the end of the boom is achieved. Due to the complexity of the system, parameters, such as the switch pulse 61 from pumping cylinder of pump truck, the switch pulse 62 from switch valve of pump truck, the information 63 about position and amplitude variation of boom, the information 64 about the safety monitoring system for monitoring vibration of the boom, the hydraulic pressure 11 of the hydraulic system or the like, are also required to be monitored by the vibration suppression controller 44 to provide supplemental control parameters for the vibration suppression electromagnetic valve 43.

Embodiment 2

Figure 8:
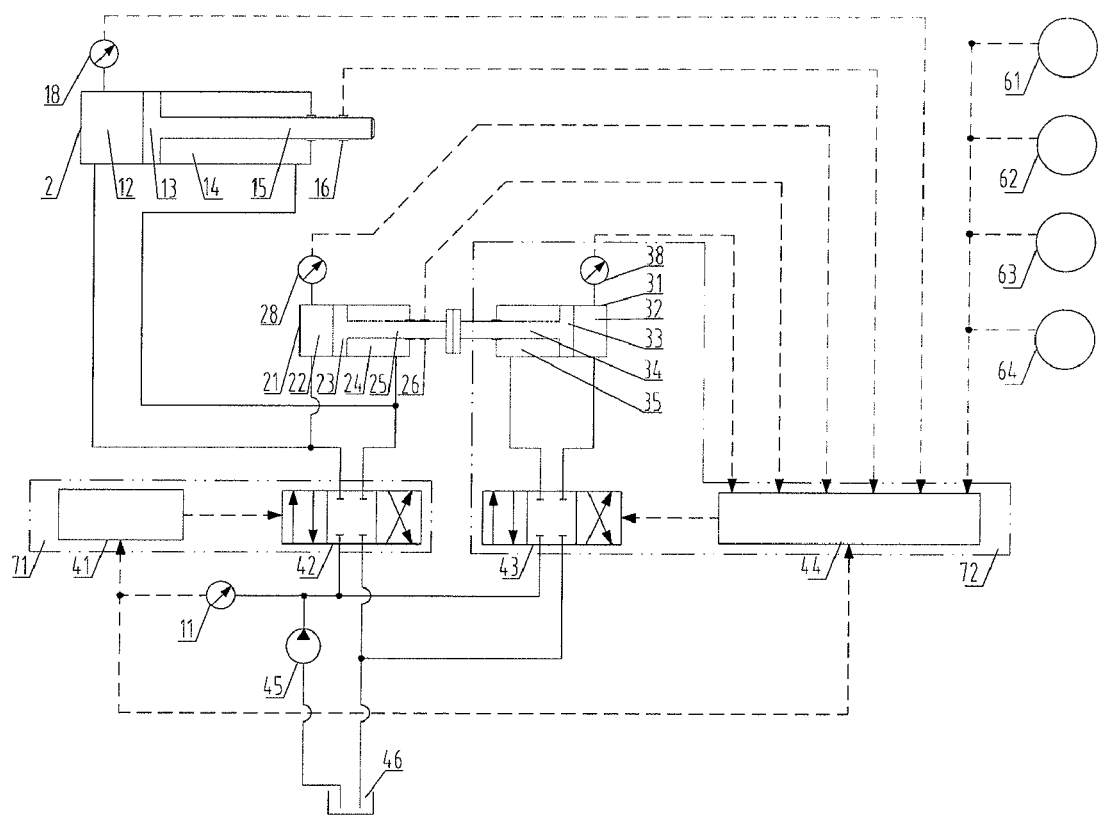
FIG. 8 illustrates a structural diagram of a first vibration suppression device applying the vibration suppression method according to the second embodiment of the present invention.
Figure 11:
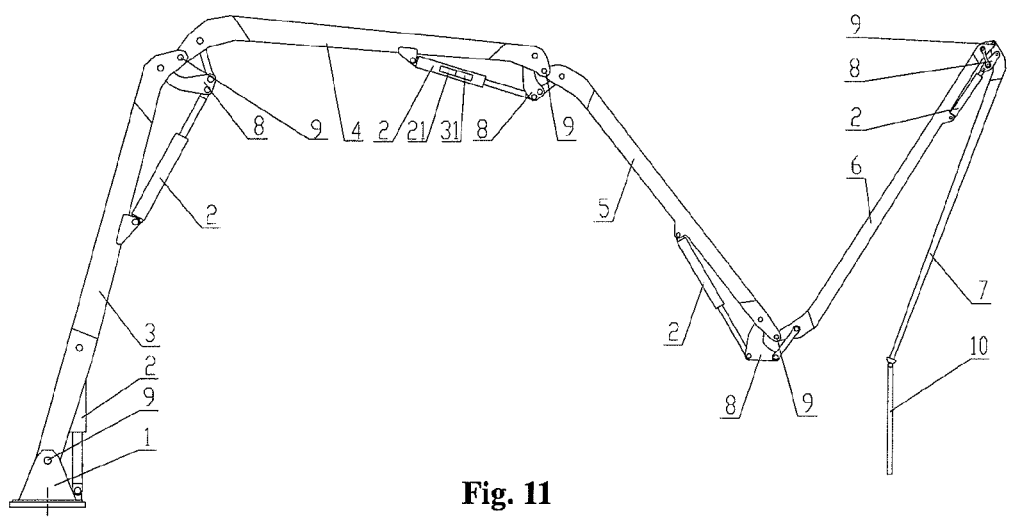
FIG. 11 illustrates a structural diagram of a boom provided with the first vibration suppression device according to the second embodiment of the present invention.

Based on the above vibration suppression method, the present invention provides a device for suppressing vibration of boom of concrete pump truck, comprising a boom cylinder 2, a control unit 71 for boom cylinder, a vibration suppression cylinder 21, a control unit 72 for vibration suppression cylinder and a monitoring unit, wherein the boom cylinder 2 is connected with the vibration suppression cylinder 21, the control unit 71 for boom cylinder is connected with the boom cylinder 2, the control unit 72 for vibration suppression cylinder is connected with the vibration suppression cylinder 21, and the monitoring unit for monitoring hydraulic pressure in the boom cylinder 2 and/or for monitoring changing of concrete pumping direction is connected with the control unit 72 for vibration suppression cylinder. The monitoring unit comprises a first pressure sensing unit 18 for monitoring the boom cylinder 2 and a second pressure sensing unit 28 for monitoring the vibration suppression cylinder 21. The boom cylinder 2 is divided into a non-rod side chamber 12 of the boom cylinder and a rod side chamber 14 of the boom cylinder by a piston 13 of the boom cylinder, and the vibration suppression cylinder 21 is divided into a non-rod side chamber 22 of the vibration suppression cylinder and a rod side chamber 24 of the vibration suppression cylinder by a piston 23 of the vibration suppression cylinder. Hydraulic oils for the control unit 72 for vibration suppression cylinder and the control unit 71 for boom cylinder are both supplied by a main hydraulic pump 45 and a hydraulic reservoir 26. Among which, the hydraulic cylinder 2 is connected with the vibration suppression cylinder 21 via piping lines. As shown in FIG. 8, the control unit 71 for vibration suppression cylinder comprises a vibration suppression controller 44, a vibration suppression electromagnetic valve 43 and a control cylinder 31, and the vibration suppression controller 44 is connected with the control cylinder 31 via the vibration suppression electromagnetic valve 43 and the vibration suppression controller 44 is coupled with the monitoring unit via a bus. A piston rod 34 of the control cylinder 31 is connected with a piston rod 25 of the vibration suppression cylinder 21. In the present embodiment, the ratio between the rod side chamber 24 and the non-rod side chamber 22 of the vibration suppression cylinder 21 is consistent with or approximate to the ratio between the rod side chamber 14 and the non-rod side chamber 12 of the boom cylinder 2. Operating parameters of the boom cylinder 2, the vibration suppression cylinder 21 and the control cylinder 31, i.e. pressures and/or position of respective pistons, are monitored by the monitoring unit in real time. The monitoring unit further comprises a set of or several sets of displacement sensing units, which correspondingly comprise a first displacement sensing unit 16 for monitoring the boom cylinder 2 and a second displacement sensing unit 26 for monitoring the vibration suppression cylinder 21. The control unit 72 for vibration suppression cylinder is further capable to monitor a switch pulse 61 from pumping cylinder of pump truck, a switch pulse 62 from switch valve of pump truck, information 63 about position and amplitude variation of boom, information 64 about a safety monitoring system for monitoring vibration of boom, etc. Based on the monitored information, the vibration suppression controller 44 performs an analysis, controls actions of the vibration suppression electromagnetic valve 43 in accordance with a preferred algorithm, and drives the piston rod 34 of the control cylinder to reciprocate in line with the preferred algorithm such that the piston rod 25 of the vibration suppression cylinder is driven to move. In this way, the movement is transmitted to the piston rod 25 of the vibration suppression cylinder, and the rod 25 starts to reciprocate in a certain manner. Due to the incompressibility of the hydraulic liquid, the rod side chamber 24 of the vibration suppression cylinder is communicated with the rod side chamber 14 of the boom cylinder, and the non-rod side chamber 22 of the vibration suppression cylinder is communicated with the non-rod side chamber 12 of the boom cylinder, thus the piston rod 15 of the boom cylinder is further driven to generate a tiny pulsation. Such a pulsation acts on the boom and is further transmitted to the end of the boom. This pulsation is provided with a reverse phase and an identical frequency with respect to the vibration caused by the intermittent concrete supply and has and a amplitude which is smaller than or equals to the amplitude of the vibration caused by the intermittent concrete supply, such that the overall vibration of the boom may be suppressed in a desired level. Between every two neighboring boom segments, there is provided with one boom cylinder 2, and the vibration suppression cylinder 21 is preferably mounted on the boom and fixed to boom cylinder 2. In this way, a shortest arrangement for oil circuits and electrical circuits may be realized. However, under certain requirements, it is also possible to arrange the vibration suppression cylinders 21 on the chassis. Meanwhile, to achieve an improved appearance and a modularized and interchangeable structure, the vibration suppression electromagnetic valve 43 is preferably integrated with the vibration suppression cylinder 21 and the control cylinder 31 to form an integral valve configuration. Furthermore, the vibration suppression cylinder 21, the control cylinder 31, the vibration suppression electromagnetic valve 43 and the vibration suppression controller 44 may be integrated together to provide a vibration suppression unit. Such a vibration suppression unit may be fitted to the boom of the pump truck or be fitted to the truck body, and may adapt to all kinds of existing concrete pump trucks or other types of pump trucks only by adjusting of controlling parameters, Referring to FIG. 11, which illustrates a side view of a concrete pump truck when the truck is running or the boom is in its retracted position, with a vibration suppression device according to the present invention provided thereon. Among which, a first boom segment 3, a second boom segment 4, a third boom segment 5, a fourth boom segment 6 and a fifth boom segment 7 are folded together through retraction movement of the pistons of boom cylinders 2. Each segment of the boom rotates with respect to one another about pivots 9 so as to be folded and unfolded. Due to the restriction of the available space and the configuration, the rotation of these boom segments about the pivots 9 is limited within a certain range. A driving means, i.e. a boom cylinder 2, is required to drive each boom segment to rotate. With a movement of the piston in the boom cylinder 2, the next boom segment is driven to rotate via a linkage 8. A rotating platform 1 is mounted on a truck chassis or a mobile lifting platform. When operated, the rotating platform 1 and components thereon may rotate about a vertical axis, and concrete is transported to a hose 10 located at the end of the boom through a pipe attached to the boom and then discharged from the outlet of the hose 10 to prescribed sites. The boom cylinder 2 is connected with the vibration suppression cylinder 21 via piping lines and the vibration suppression cylinder 21 is fixed to the boom cylinder 2.

According to the present invention, a boom cylinder 2 is indirectly driven, such that the boom is capable of vibrating with variable amplitudes by means of the boom cylinder 2 under the control of the control unit 71 for boom cylinder. A separate vibration suppression system is designed to suppress vibrations of the boom, wherein the hydraulic oil of the boom cylinder 2 is kept constant in the case that the vibration with variable amplitudes is not implemented, while the piston rod 25 of the vibration suppression cylinder is capable of generating a reciprocating, pulsed displacement. However, as a matter of fact, when the control unit 71 for boom cylinder does not perform any operation, the piston of boom cylinder 2 will be kept at rest and can not move. The displacement of the piston rod 25 of the vibration suppression cylinder will cause the hydraulic oil to flow within the boom cylinder 2 and the vibration suppression cylinder 21, i.e., the movement of the piston rod 25 of the vibration suppression cylinder is transmitted to the piston rod 15 of the boom cylinder by the hydraulic oil such that the piston rod 15 of the boom cylinder may displace correspondingly. That is to say, the displacement of the piston rod 25 of the vibration suppression cylinder may be appropriately controlled, the displacement of the piston rod 25 of the vibration suppression cylinder may be in turn transmitted to the piston rod 15 of the boom cylinder via the piping lines, and the piston rod 15 of the boom cylinder may perform a pulsed movement in line with a desired control manner.

The stroke of the piston rod 25 of the vibration suppression cylinder may be controlled in two different modes, i.e. a manual vibration suppression control mode and an automatic vibration suppression control mode, as required. The switch between the two control modes may be carried out by a control switch provided on a remote controller. If an automatic vibration suppression mode is selected, the stroke of the vibration suppression cylinder 21 may be automatically controlled by the control unit 72 for vibration suppression cylinder; otherwise, if a manual vibration suppression control mode is selected, the stroke of the vibration suppression cylinder 21 may be manually controlled by the remote controller. In the latter case, the stroke may be divided into several sub-strokes and be correspondingly controlled by the remote controller. Due to the complexity of the system, parameters, such as the switch pulse 61 from the pumping cylinder of the pump truck, the switch pulse 62 from the switch valve of the pump truck, information 63 about position or posture of the boom and amplitude variation, information about the safety monitoring system for monitoring vibration of the boom, the hydraulic pressure in the hydraulic system or the like, are also required to be monitored by the vibration suppression controller 44 to provide reference control parameters for the vibration suppression electromagnetic valve 43.

Figure 9:
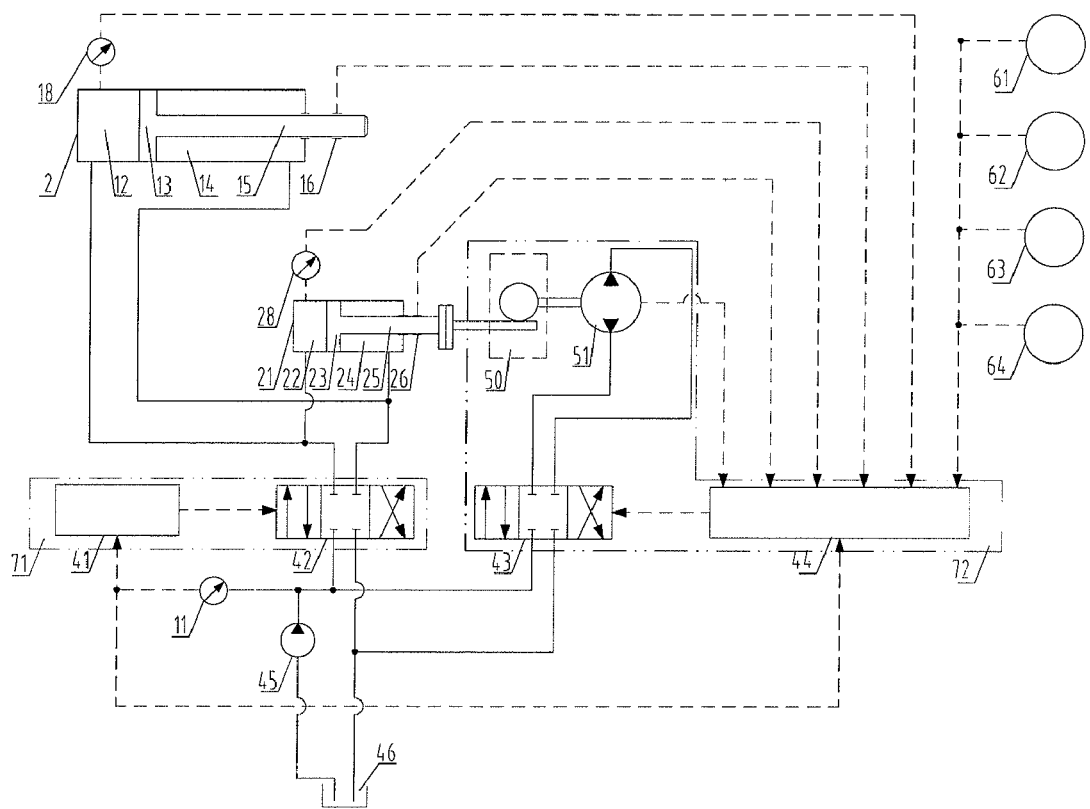
FIG. 9 illustrates a structural diagram of a second vibration suppression device based on the vibration suppression method according to the second embodiment of the present invention.

Referring to FIG. 9, which illustrates an alternative of the present embodiment, a control unit 72 for vibration suppression cylinder comprises a vibration suppression controller 44, a vibration suppression electromagnetic valve 43, a hydraulic motor 51 and a torque converting mechanism 50. The vibration suppression controller 44 is connected with the hydraulic motor 51 via the vibration suppression electromagnetic valve 43 and is also coupled with a monitoring unit. The hydraulic motor 51, whose operation is controlled by the vibration suppression electromagnetic valve 43, is connected with the piston rod 25 of the vibration suppression cylinder via the torque converting mechanism 50. Driving force is transmitted to the piston rod 25 of the vibration suppression cylinder via the torque converting mechanism 50 such that the boom cylinder 2 is driven to perform a pulsed displacement for suppressing the vibration of the boom. The torque converting mechanism 50 may be one of a cam mechanism, a pinion-and-rack mechanism, a gear-worm mechanism, a linkage mechanism, etc. Alternatively, the hydraulic motor 51 may be replaced with electrical, electromagnetical or pneumatical power source. The driving may be a high speed rotation such that a compact driving system may be designed. Further, by an appropriate conversion of the torque converting mechanism 50, a desired reciprocating movement of the piston rod 25 of the vibration suppression cylinder in line with a preferred vibration suppression pattern may be obtained.

Figure 10:
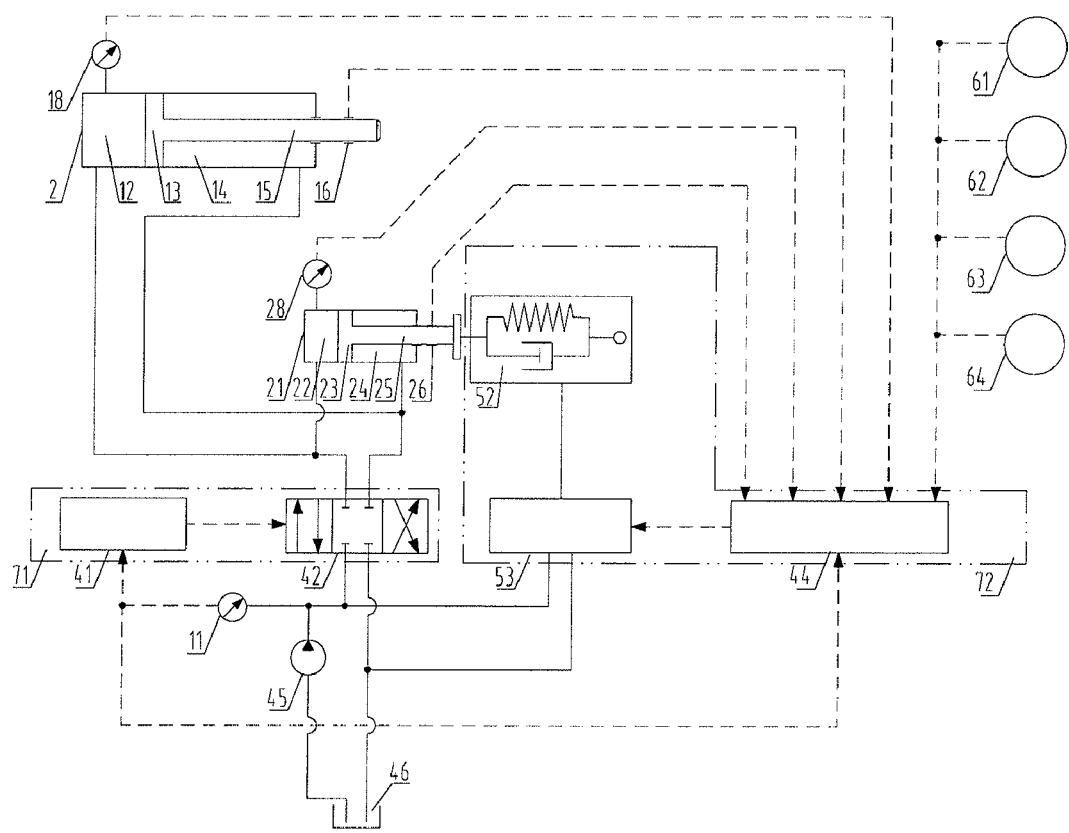
FIG. 10 illustrates a structural diagram of a third vibration suppression device applying the vibration suppression method according to the second embodiment of the present invention.

Referring to FIG. 10, which illustrates another alternative of the present embodiment, a control unit 72 for vibration suppression cylinder comprises a spring damping device 52, a spring damping controller 53 and a vibration suppression controller 44 coupled with the monitoring unit, wherein the vibration suppression controller 44 is connected with the spring damping device 52 via the spring damping controller 53. In an active control mode, the spring damping device 52 is controlled by the spring damping controller 53. More preferably, an inactive control is adopted for the spring damping device 52, in which the vibration at the end of the boom may be effectively suppressed even thought the spring damping device 52 and the spring damping controller 53 are cancelled.

Only several embodiments of the present invention are described hereinabove. It can be appreciated that the present invention is not limited to the described embodiments or a combination thereof.

What is claimed is:

1. A method for suppressing vibration of a boom of a concrete pump truck, comprising the steps of:

connecting a boom cylinder with a vibration suppression cylinder via piping lines, wherein a rod side chamber as well as a non-rod side chamber in the boom cylinder are in communication with a rod side chamber as well as a non-rod side chamber in the vibration suppression cylinder, respectively;

monitoring information about hydraulic pressure in the boom cylinder and/or information about changing of concrete pumping direction by a pressure sensing unit in real time;

transmitting the monitored information about hydraulic pressure and/or the information about changing of concrete pumping direction to a control unit for vibration suppression cylinder;

configuring the control unit for the vibration suppression cylinder to analyze and process the monitored information and then adjusting volumes of the rod side chamber and the non-rod side chamber in the vibration suppression cylinder and correspondingly changing volumes of the rod side chamber and the non-rod side chamber in the boom cylinder such that the vibration suppression cylinder and the boom cylinder generates a pulsed vibration;

wherein the pulsed vibration from the vibration suppression cylinder and the boom cylinder causes a pulsed vibration at the end of the boom, and the pulsed vibration at the end of the boom is less than or equal in amplitude to a vibration caused by an intermittent concrete supply at the end of the boom and is reversed in phase with respect to the vibration caused by the intermittent concrete supply at the end of the boom.

2. The method for suppressing vibration of the boom of the concrete pump truck according to claim 1, wherein
information about displacement of a piston rod of the boom cylinder and/or displacement of a piston rod of the vibration suppression cylinder is monitored by a monitoring unit in real time, transmitting the monitored displacement information to the control unit for the vibration suppression cylinder, and the control unit for the vibration suppression cylinder analyzes and processes the monitored information and then, taking into account the information about hydraulic pressure in the boom cylinder and/or the vibration suppression cylinder, repeatedly adjusts the volumes of the rod side chamber and the non-rod side chamber in the vibration suppression cylinder.

3. A device for suppressing vibration of a boom of a concrete pump truck, comprising:
a boom cylinder, a control unit for the boom cylinder, a vibration suppression cylinder, a control unit for the vibration suppression cylinder and a monitoring unit, wherein the boom cylinder is connected with the vibration suppression cylinder fixedly, the control unit for the boom cylinder is connected with the boom cylinder, the control unit for vibration suppression cylinder is connected with the vibration suppression cylinder, and the monitoring unit for monitoring information about hydraulic pressure in the boom cylinder and/or information about changing of concrete pumping direction is connected with the control unit for the vibration suppression cylinder.

4. The device for suppressing vibration of the boom of the concrete pump truck according to claim 3, wherein
a non-rod side chamber in the boom cylinder is fixedly connected with a non-rod side chamber in the vibration suppression cylinder, with a partition plate provided between the non-rod side chamber of the boom cylinder and the non-rod side chamber of the vibration suppression cylinder.

5. The device for suppressing vibration of the boom of the concrete pump truck according to claim 3, wherein
a piston rod of the vibration suppression cylinder is fixedly connected with the boom cylinder.

6. The device for suppressing vibration of the boom of the concrete pump truck according to claim 3, wherein
a piston rod of the boom cylinder is fixedly connected with the vibration suppression cylinder.

7. The device for suppressing vibration of the boom of the concrete pump truck according to claim 3, wherein
a piston rod of the vibration suppression cylinder is fixedly connected with a piston rod of the boom cylinder.

8. The device for suppressing vibration of the boom of the concrete pump truck according to claim 3, wherein
the control unit for the vibration suppression cylinder comprises a vibration suppression controller and an electromagnetic valve, the vibration suppression controller is connected with the vibration suppression cylinder via the vibration suppression electromagnetic valve and the vibration suppression controller is connected with the monitoring unit.

9. A method for suppressing vibration of a boom of a concrete pump truck, comprising the steps of:
fixedly connecting a boom cylinder with a vibration suppression cylinder;
monitoring information about hydraulic pressure in the boom cylinder and/or information about changing of concrete pumping direction by a pressure sensing unit in real time;
transmitting the monitored information about hydraulic pressure and/or the information about changing of concrete pumping direction to a control unit for vibration suppression cylinder;
configuring the control unit for the vibration suppression cylinder to analyze and process the monitored information and then adjusting volumes of a rod side chamber and a non-rod side chamber in the vibration suppression cylinder such that the vibration suppression cylinder generates a pulsed vibration;
wherein the pulsed vibration from the vibration suppression cylinder causes a pulsed vibration at the end of the boom, and the pulsed vibration at the end of the boom is less than or equal in amplitude to a vibration caused by an intermittent concrete supply at the end of the boom and is reversed in phase with respect to the vibration caused by the intermittent concrete supply at the end of the boom.

10. The method for suppressing vibration of the boom of the concrete pump truck according to claim 9, wherein
information about displacement of a piston rod of the boom cylinder and/or displacement of a piston rod of the vibration suppression cylinder is monitored by a monitoring unit in real time, transmitting the monitored displacement information to the control unit for the vibration suppression cylinder, and the control unit for the vibration suppression cylinder analyzes and processes the monitored information and then, taking into account the information about hydraulic pressure in the boom cylinder and/or the vibration suppression cylinder, repeatedly adjusts the volumes of the rod side chamber and the non-rod side chamber in the vibration suppression cylinder.

11. A device for suppressing vibration of a boom of a concrete pump truck, comprising:
a boom cylinder, a control unit for the boom cylinder, a vibration suppression cylinder, a control unit for the vibration suppression cylinder and a monitoring unit, wherein the boom cylinder is connected with the vibration suppression cylinder, the control unit for the boom cylinder is connected with the boom cylinder, the control unit for vibration suppression cylinder is connected with the vibration suppression cylinder, and the monitoring unit for monitoring information about hydraulic pressure in the boom cylinder and/or information about changing of concrete pumping direction is connected with the control unit for the vibration suppression cylinder, and
a rod side chamber and a non-rod side chamber in the boom cylinder are in communication with a rod side chamber and a non-rod side chamber in the vibration suppression cylinder, respectively, via piping lines.

12. The device for suppressing vibration of the boom of the concrete pump truck according to claim 11, wherein
the control unit for the vibration suppression cylinder comprises a vibration suppression controller, a vibration suppression electromagnetic valve and a control cylinder, the vibration suppression controller is connected with the control cylinder via the vibration suppression electromagnetic valve and connected with the monitoring unit, and a piston rod of the control cylinder is connected with a piston rod of the vibration suppression cylinder.

13. The device for suppressing vibration of the boom of the concrete pump truck according to claim 11, wherein
the control unit for the vibration suppression cylinder comprises a vibration suppression controller, a vibration suppression electromagnetic valve, a hydraulic motor, and a torque converting mechanism, the vibration suppression controller is connected with the hydraulic motor via the vibration suppression electromagnetic valve and coupled with the monitoring unit, and the hydraulic motor is connected with a piston rod of the vibration suppression cylinder via the torque converting mechanism.

14. The device for suppressing vibration of the boom of the concrete pump truck according to claim 11, wherein
the control unit for the vibration suppression cylinder comprises a spring damping device, a spring damping controller, and a vibration suppression controller, the vibration suppression controller connected with the monitoring unit, and the vibration suppression controller is connected with the spring damping device via the spring damping controller.

15. The device for suppressing vibration of the boom of the concrete pump truck according to claim 11, wherein
the boom cylinder is provided between every two neighboring segments of the boom, the vibration suppression cylinders are fitted on the boom or the truck body, and the vibration suppression cylinders are connected with the boom cylinder via piping lines.

\* \* \* \* \*